United States Patent [19]
Mee

[11] Patent Number: 5,466,025
[45] Date of Patent: Nov. 14, 1995

[54] END EFFECTOR CLAMPING JAW INTERFACE FOR ATTACHMENT TO AN ORBITAL REPLACEMENT UNIT

[75] Inventor: Frances H. A. Mee, Alliston, Canada

[73] Assignee: Canadian Space Agency/Agence Spatiale Canadienne, Canada

[21] Appl. No.: 5,066

[22] Filed: Jan. 15, 1993

[51] Int. Cl.⁶ .................. B66C 1/62; B64G 4/00
[52] U.S. Cl. .............. 294/1.1; 294/86.4; 244/161; 411/371
[58] Field of Search .................. 294/1.1, 82.32, 294/82.34, 86.33, 86.4, 90, 902; 244/137.4, 161; 901/30, 31, 39; 411/368, 371, 396; 175/320

[56] References Cited

U.S. PATENT DOCUMENTS

| | | | |
|---|---|---|---|
| 1,800,345 | 4/1931 | Gustafson | 294/90 X |
| 2,942,903 | 6/1960 | Giladett | 294/82.32 X |
| 3,237,427 | 3/1966 | Scarborough | 175/320 X |
| 3,600,031 | 8/1971 | Coleman et al. | 294/90 X |
| 4,448,405 | 5/1984 | Cipolla | 901/39 X |
| 4,585,369 | 4/1986 | Manesse et al. | 294/86.33 X |
| 4,645,411 | 2/1987 | Madwed | 901/39 X |
| 4,929,011 | 5/1990 | Vandersluis et al. | 294/1.1 X |
| 5,131,705 | 7/1992 | Gluck et al. | 294/82.32 |

*Primary Examiner*—Dean Kramer
*Attorney, Agent, or Firm*—David J. French

[57] ABSTRACT

An end effector clamping jaw interface for attachment to an orbital replacement unit wherein the interface consists of a bodying having a reduced waist portion and V-shaped clamping faces that project laterally outwardly from opposite sides of the waist portion for engagement by an end effector. The interface may also incorporate a latching mechanism that is used for releasably latching the interface and the orbital replacement unit to which it is attached to a compatible system. A latch actuator is provided which serves to release the latch mechanism when the interface is engaged by a complimentary end effector.

11 Claims, 3 Drawing Sheets

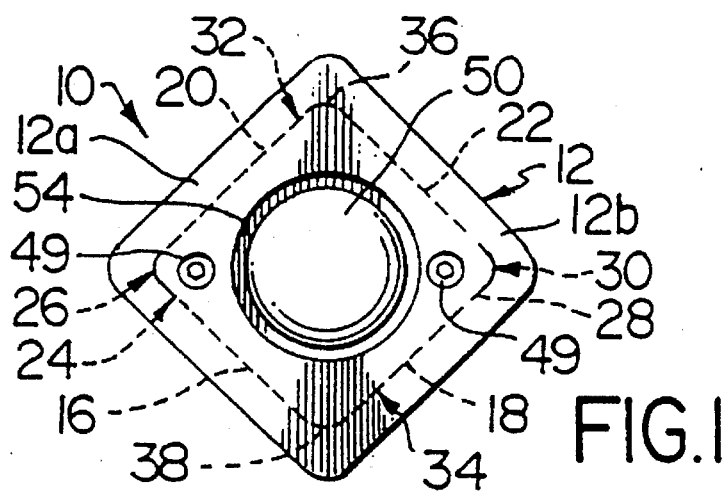
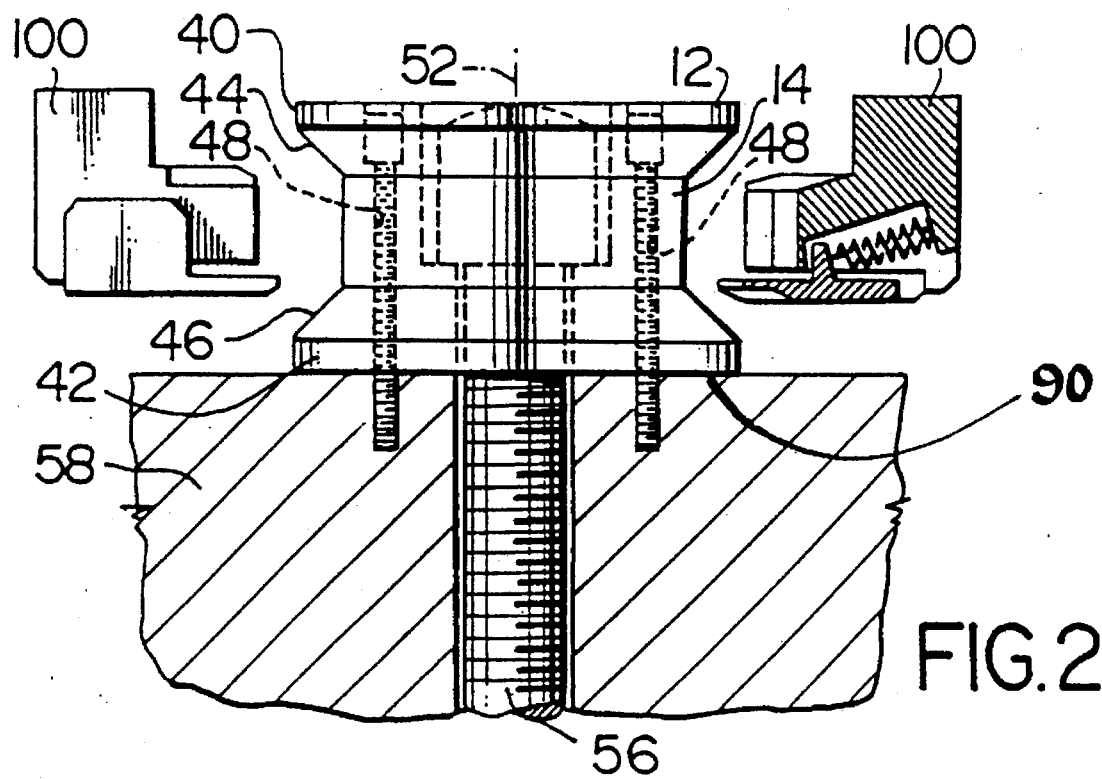

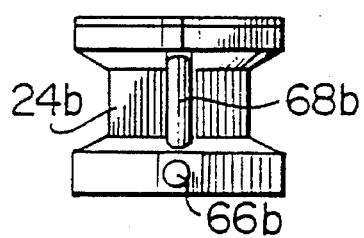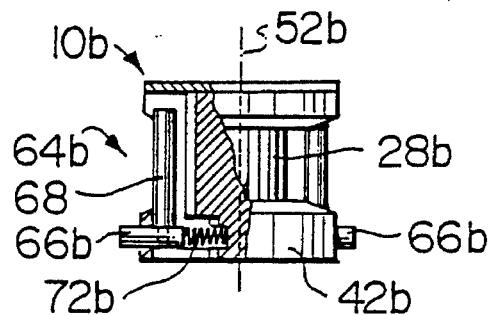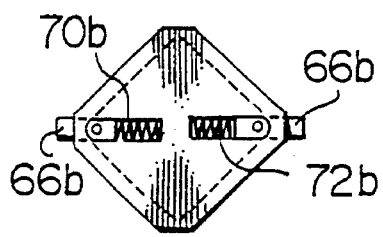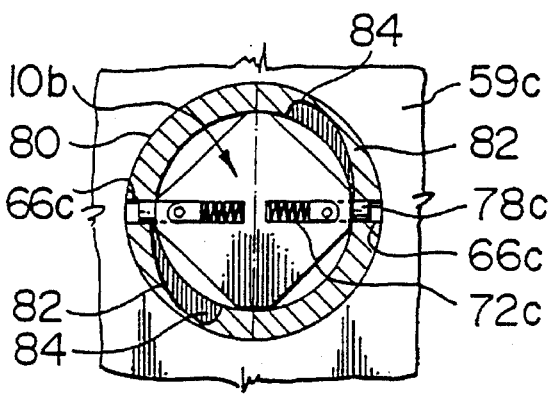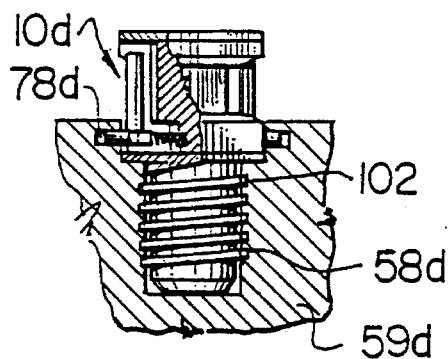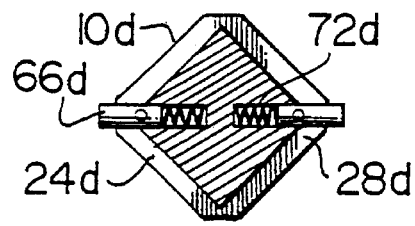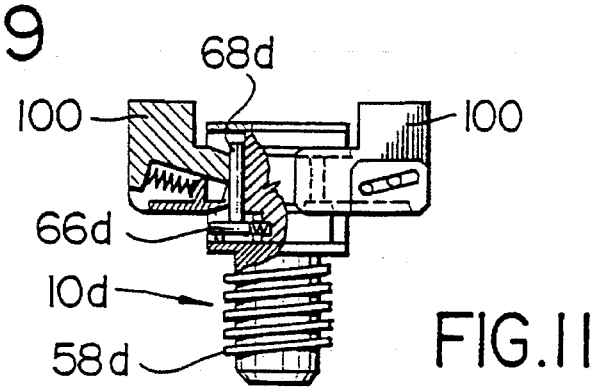

5,466,025

1

END EFFECTOR CLAMPING JAW INTERFACE FOR ATTACHMENT TO AN ORBITAL REPLACEMENT UNIT

BACKGROUND OF THE INVENTION

This invention relates to an end effector clamping jaw interface assembly for attachment to an orbital replacement unit. More particularly, this invention relates to an interface that is designed for use with a manipulator. In particular, this invention relates to an interface for orbital replacement units for use in the aerospace industry.

An interface has been designed for use with orbital replacement units for the type intended for use during satellite servicing. The interface which has been previously designed has an H-shaped configuration. The end effector that is used with this H-shaped interface has lugs that project into the oppositely disposed U-shaped recesses of the H-shaped configuration. This H-shaped interface is, however, rather large and it is not suitable for use as a micro-interface for attachment to small replacement units. A wide variety of small replaceable units are required as orbital replacement units in space stations and the like. The need for both the large interface and a micro-interface has been recognized in the aerospace industry.

The conventional H-shaped configuration provides an interface that measures about 4.5" in length, 2.5" in width, and 0.5" in thickness. A micro-interface should preferably not measure more than about 1.5"×1.5"×1.5".

SUMMARY OF INVENTION

According to the present invention there is provided an end effector, clamping jaw interface for attachment to an orbital replacement unit, comprising:

a) two substantially rigid body portions or parts positioned about a central axis, each body part having an upper ramp, a lower ramp, and a reduced waist portion between the upper and lower ramps, and wherein b) the upper and lower ramps for each body portion from a corner and are inclined inwardly towards apice forming side faces for the waist which converge outwardly from the apices to form laterally extending, substantially V-shaped clamping faces, whereby, c) with the two body parts attached to an orbital replacement unit with the substantially V-shaped clamping faces extending outwardly in opposite directions from one another and locatable by aligning end effector clamping jaws with the corners of the ramps, the d) the inwardly inclined ramps will effect vertical engagement of end effector clamping jaws, with the orbital replacement unit, against dislodgement by vertical loads, applied therebetween, and e) the substantially V-shaped clamping faces will effect lateral clamping engagement of end effector clamping jaws to the orbital replacement unit, against dislodgement by a torque applied therebetween.

The reduced waist portions together may form a square cross-section with the V-shaped clamping faces diagonally spaced at 180° with respect to one another.

The body parts may be a pair of discrete segments each having one of said V-shaped clamping face formed thereon, said segments being attachable to opposite sides of an orbital replacement unit with the V-shaped clamping faces oppositely disposed.

Torque transmitting latch means may be provided, oper-

2 able by end effector clamping jaws, for releasably attaching said body parts to a system in which a replaceable unit is to be mounted, said latch means may comprise detent means mounted on each of the body parts for movement between an extended position projecting laterally from the part on which it is mounted and a retracted position that is located inwardly, from the extended position, towards that body part and resilient means for urging the detent means towards the said extended position. For effective transmittal of torque, said torque transmitting means are displaced from, and located on opposite sides of, a central axis of the interface.

The apex of each V-shaped clamping face may form a longitudinally extending ridge and said latch means may further comprise a latch actuator member connected to said detent means for movement therewith and extending parallel to the longitudinally extending ridge associated therewith, each latch actuator member being movable, from a first position disposed laterally outwardly from its associated ridge, when said detent means is in said extended position, to a second position located inwardly from its associated ridge, when the associated detent means is in said retracted position, such that displacement of each latch actuator from the first position to the second position, when each latch actuator member is engaged by an end effector moving into engagement with the clamping faces, will cause both the detent means to move from their extended positions to their retracted positions.

The reduced waist portions together may form a square to provide first and second sets of oppositely disposed ridges, cross-section each latch actuator means being associated with one of the ridges for the first set thereof, the ridges of the second set thereof begin spaced from the latch actuator means so as to be engageable by an end effector.

BRIEF DESCRIPTION OF THE DRAWINGS

FIG. 1 is a plan view of an interface constructed in accordance with an embodiment of the present invention.

FIG. 2 is a partially sectioned side elevation for the interface of FIG. 1 attached to an interface and illustrating the manner in which it may be engaged by an end effector in use.

FIG. 5 is a front elevation of an interface which has a latching mechanism for releasably attaching the replaceable unit to the system in which it is to be used.

FIG. 6 is a partially sectioned side view of the interface of FIG. 5.

FIG. 7 is a bottom plan view of the interface of FIG. 6.

FIG. 8 is a partially sectioned plan view of an interface and a coupling suitable for attachment to a replacement unit to permit manual insertion of the replacement unit into the system.

FIG. 9 is a partially sectioned side view of an interface constructed in accordance of an embodiment of the present invention that is formed as an integral part of a threaded component showing the manner in which the interface serves to secure the replacement unit to the system in which it is to be used.

FIG. 10 is a cross-sectional view of the interface of FIG. 9 taken through the latching detents.

FIG. 11 is a partially sectioned side view of the interface of FIG. 9 showing the manner in which it is engaged by an end effector to react the latching mechanism.

DESCRIPTION OF THE PREFERRED EMBODIMENT

Figure 3:
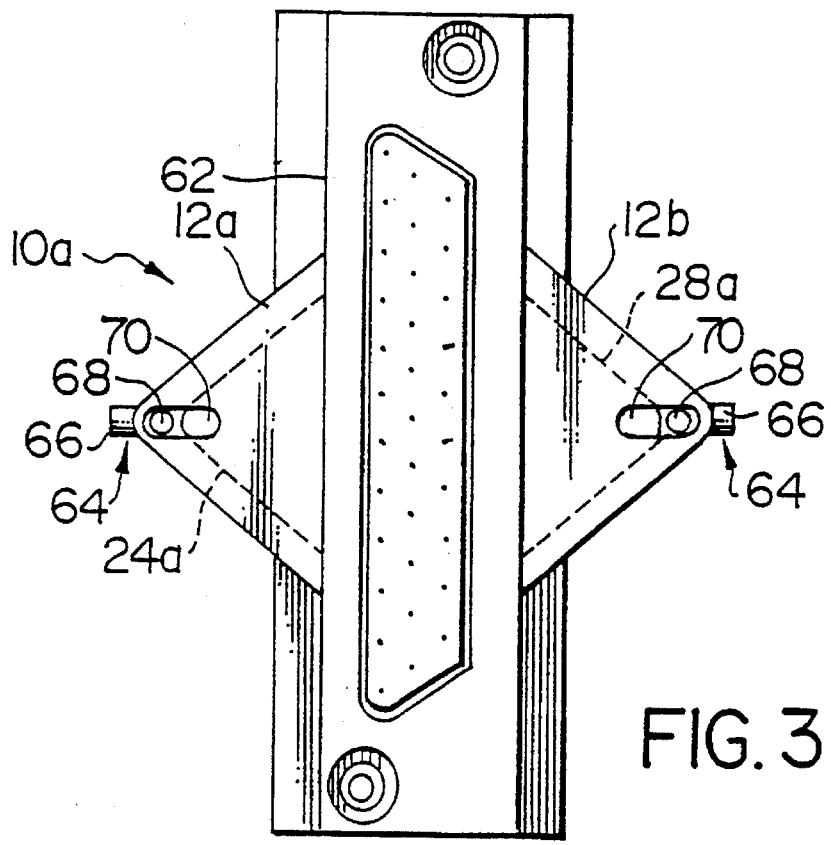
FIG. 3 is a plan view of an interface constructed in accordance with a further embodiment of the present invention.

With reference to FIGS. 1 and 2 of the drawings, the reference numeral 10 refers generally to an interface constructed in accordance with an embodiment of the present invention.

The interface 10 has a body 12, comprising two substantially rigid body parts 12a and 12b, each having a reduced waist portion 14. The reduced waist portions 14 together form a square cross-section having side faces 16, 18, 20 and 22. The side faces 16 and 20 cooperate with one another to form a first, outwardly extending, V-shaped clamping face generally identified by the reference numeral 24, which has an apex 26. The side faces 18 and 22 cooperate with one another to form a second, outwardly extending, V-shaped clamping face which is generally identified by the reference numeral 28 and which has an apex 30. The V-shaped clamping faces 24 and 28 project laterally outwardly at opposite sides of the waist portion. Third and fourth V-shaped clamping faces 32 and 34 are located opposite one another and have apices 36 and 38 respectively.

The body parts 12a and 12b also provide the body 12 with an upper end portion 40 and a lower end portion 42 both of which project outwardly from the waist portion 14. A face surface 90 is formed on the bottom of the lower end portion 42 to abut against a unit 58 to which the interface 10 is attached. A corner forming upper ramp 44 is formed on the upper portion 40 and is inclined inwardly towards the apices of the the side faces 16, 18, 20 and 22 of 14. A corner forming lower ramp 46 is formed on the lower portion 42 and is inclined towards the apices of the side faces 16, 18, 20 and 22 of the waist portion 14. The corners of the ramps 44 and 46 serve to indicate the locations of the apices and then guide and hold vertically an end effector tool 100 into engagement with the waist portion 14.

The body parts 12a and 12b also provide the body with a passage 50 that extends therethrough along the central axis 52. The passage 50 is countersunk to provide a shoulder 54. In use, a mounting bolt 56 is used to attach the orbital replaceable unit 58 to the system in association with which it is to be used. The unit 58 may be an orbital replacement unit (ORU) to be used in a space satellite.

Mounting passages 48 are formed in the body 12 and mounting screws 49 extend through the passages 48 and serve to attach the body 12 to the orbital replacement unit 58. These screws, being displaced from, and located on opposite sides of, axis 52, as shown in the drawings, constitute protrusions from the interface that provide torque transmitting means between the interface and the unit 58.

The interface 10 that is described in FIGS. 1 and 2 of the drawings may be proportioned so as to be suitable for use with small orbital replacement units. For example, the axial length of the waist portion 14 may measure 0.4 inches and the length axial [height]of the ramp portions 44 and 46 may measure 0.25 inches. The length of each diagonal of the square-shaped cross section of the waist portion 14 may measure 1.125 inches and the overall height may measure 1.25 inches. The length of each diagonal of the upper and lower portions 40 and 42 may measure 2.15 inches and the length of each side face of the upper and lower portion 40 and 42 may measure 1.625 inches.

Figure 4:
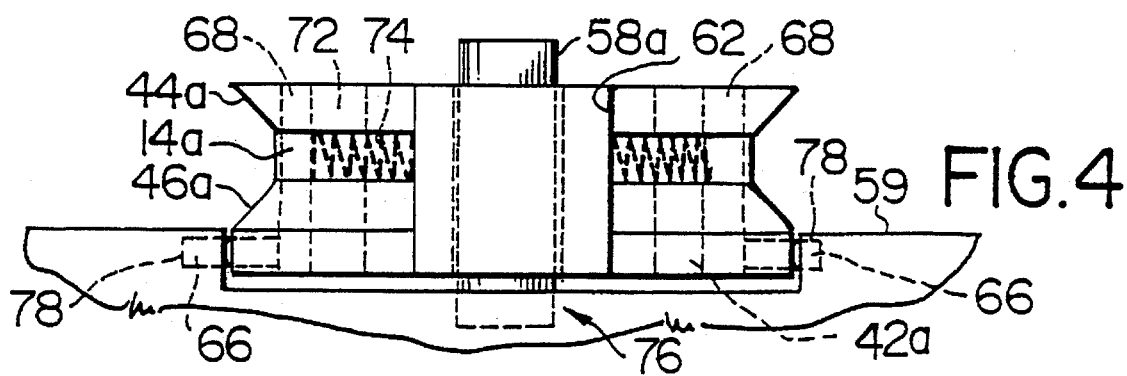
FIG. 4 is an end view of the assembly of FIG. 3.

FIGS. 3 and 4 illustrate a further embodiment of the present invention in which the interface that is generally identified by the reference numeral 10a comprises a pair of body parts in the form of two discrete segments 12a and 12b which are attached to opposite sides of a replaceable unit in the form of a connector 62. The segments 12a and 12b are arranged with the V-shaped clamping faces oppositely disposed so as to be capable of functioning in a like manner to that described with reference to FIGS. 1 and 2. The reference numerals, other than 12a and 12b, that have been applied to the embodiment illustrated in FIGS. 3 and 4 to parts which are functionally the same as the corresponding parts described with reference to FIGS. 1 and 2 are distinguished by the suffix "a".

The interface 10a is further distinguished from the interface 10 in that it has two torque transmitting latch mechanisms (64, displaced from and arranged on opposite sides of the central axis of the interface, one located at the apex of each V-shaped clamping face. Each latch mechanism 64 includes a detent pin 66 and an actuator pin 68. Each detent pin 66 is slidably mounted in the lower portion 42a for movement between the extended position shown in FIGS. 3 and 4 and retracted position in which it is withdrawn into the lower portion 42a. An elongated slot 70 is formed in the body portions 12a and 12b for each latch mechanism 64 and extends inwardly of the apex of the clamping faces 24a and 28a. Each latch actuator pin 68 is attached to its detent pin 66 and extends perpendicularly therefrom and is slidably mounted in the elongated slot 70 therefor. A compression spring 72 is mounted in each passage 74 and serves to bear against the associated actuator pin 68 so that it normally urges that actuator pin to the extended position shown in FIG. 3.

In use when the jaws of an end effector 100 move toward engagement with the oppositely disposed V-shaped clamping faces 24a and 28a, the jaws will initially contact the latch actuator pins 68 and as the jaws move toward the V-shaped clamping faces, the latch actuator pins 68 will be driven inwardly toward one another. This action will serve to move the detent pins 66 from their extended position to their retracted position. As a result, it is then possible to release the replaceable unit or connector 62 from the system 59 to which it is connected.

When the connector 62 is to be attached to the system 59, the jaws of the end effector will again close on the V-shaped clamping faces 24a and 28a and will displace the latch actuator pins 68 inwardly to move the detent pins 66 to their retracted position. The connector 62 can then be manipulated by moving the end effector until it is mated with a complementary component 76 of the system 59. The end effector can then be activated to release the clamping faces and thus permit the detent pins 66 to extend outwardly to their extended positions under the influence of the compression springs 72. The detent pins 66 then enter complementary passages 78 formed in the system 59 and as a result, the connector 62 is locked into the system 59.

FIGS. 5, 6 and 7 illustrate an interface 10b which has the same basic structure as that previously described in FIGS. 1 and 2 of the drawings with the addition of a latch mechanism 64b. The latch mechanism 64b includes detent pins 66b slidably mounted in aligned passages formed in the lower end portion 42b on opposite sides of the central axis of the interface. Each detent pin 66b has a compression spring 72b which serves to normally urge the detect pin 66b to its extended position. The latch actuator pin 68b extends upwardly from each detent pin 66b and is slidably mounted in a slot 70b (FIG. 7). Again, the latch actuator pins 68b will be automatically driven inwardly toward the axis 52b to retract the detent pins 66 as the jaws of the end effector 100 move toward engagement with the clamping faces 24b and 28b.

FIG. 8 illustrates a coupling collar 80 which may be used as a connector attached to a system 59c which will permit mounting of the interface 10b without the aid of an end effector that has clamping jaws. The collar 80 is formed with a pair of oppositely disposed mounting passages 66c and circumferentially extending ramps 82 which increase radially in an anticlockwise direction to have a maximum radial extent in the seat area 84 the detent pins 78c enter the collar 80 axially through spaces 84a extending when the detent pins 78c are in the extended position. The interface 10b can then be rotated in a clockwise direction so that the detent pins 66b travel along the ramps 82 and are driven inwardly. When the detent pins 78c are aligned with the passages 66c, compression springs 72c will drive the detent pins 78c outwardly into the passages 66c until they are located in their extended position. With the aid of this mounting collar an astronaut can, with clamping jaws, manually attach or remove the interface 10b to a system 59c which as will be described with reference to FIG. 9, 10 and 11, may be in the form of a fuse box.

FIGS. 9, 10 and 11 illustrate an interface 10d which is the same as the interface 10b (FIGS. 5 to 8) and is attached to a replaceable unit 58d in the form of an electrical fuse. In FIG. 11 the jaws 100 of an end effector are shown that are suitable for use with the interface. The jaws 100 each have a V-shaped notch formed on the inner face thereof which is complementary to the V-shaped clamping face 24d and 28d (FIG. 10) of the interface 10d. When, as shown in FIG. 11 of the drawings, the latch actuator pins 68d are driven inwardly by the jaws 100 of the end effector in the manner previously described, the detent pins 66d will be driven towards their retracted positions. The end effector can then be activated to rotate the threaded portion of the fuse 58d into engagement with a threaded socket until the fuse is fully seated. The end effector jaws 100 are then separated to release the interface and as a result, the compression springs 72d will drive the detent pins 66d outwardly to their extended position in which they extend into locking passages 78d and serve to retain the fuse in an operative position with respect to the receptacle 102 of the system 59d in which the fuse is seated in use.

From the foregoing, it will be apparent that the interface of the present invention is of a simple construction which provides a pair of oppositely disposed V-shaped clamping faces that are formed on a narrow waist. The V-shaped clamping faces may be clamped laterally by an end effector so that a considerable torque can be applied to the interface. The torque may serve to rotatably drive an orbital replaceable unit such as the fuse 58d into operable engagement with the complementary threaded socket. In addition, by providing a narrow waist, shoulders are provided above and below the waist which will permit substantial vertical or axial loads to be applied to the interface. The shoulders are preferably in the form of ramps that are inclined inwardly toward the waist which will serve to guide the clamping jaws of the end effector vertically into engagement with the clamping faces of the interface.

The releasable latch mechanism serves to permit the interface and the replaceable module attached thereto to be locked in a predetermined position with respect to a support structure of the system in which the are mounted in use. The latching pins are automatically released from the supporting structure as the jaws of the end effector move into engagement with the V-shaped clamping faces to permit removal of the replaceable unit from the system.

All of these features can be incorporated into an interface which is substantially smaller than the conventional H-shaped interface that have been previously proposed; thus permitting the interface to function as a micro-interface for use in association with small orbital replaceable units while being capable of being manipulated by a dual purpose end effector that is also capable of operably engaging, the conventional H-shaped interface.

I claim:

1. A clamping jaw interface for attachment to a unit such as an orbital replacement unit to enable clamping jaws to couple to such unit comprising:

(a) two substantially rigid body portions positioned about a central axis, each body portion having an upper ramp, a lower ramp, and a reduced waist section located between the upper and lower ramps, (b) said waist section on each body portion having side faces which converge to form laterally extending, substantially V-shaped clamping faces on opposite sides of the central axis of the interface;

(c) the upper and lower ramps of each body portion being inclined inwardly towards the side faces of the waist section;

(d) each body portion having coupling and torque transmitting means located below the waist section for releaseably attaching said portions to said unit, said coupling and torque transmitting means of each body portion including a passageway displace from said central axis and including shaft means which extends through said passageway for engagement with a corresponding recess in said unit;

whereby:

i) the inwardly inclined ramps will effect vertical engagement of said clamping jaws with said unit against dislodgement by vertical loads applied therebetween, and ii) the substantially V-shaped clamping faces will effect lateral engagement of said clamping jaws with said unit against dislodgement by a torque applied therebetween.

2. An interface as claimed in claim 1, wherein the reduced waist portions together form a square cross-section with the V-shaped clamping faces diagonally spaced at 180° with respect to one another.

3. An interface as claimed in claim 1, wherein said body portions are a pair of discrete segments each having one of said V-shaped clamping face formed thereon, said segments being attachable to opposite sides of an orbital replacement unit with the V-shaped clamping faces oppositely disposed.

4. An interface as claimed in claim 1, further comprising torque transmitting latch means, operable by end effector clamping jaws, for releasably attaching said body portions to a system in which a replaceable unit is to be mounted, said latch means comprising detent means mounted on each of the body portions for movement between an extended position projecting laterally from the part on which it is mounted and a retracted position that is located inwardly, from the extended position, towards that body portions and resilient means for urging the detent means towards the said extended position.

5. An interface as claimed in claim 4, wherein the apex of each V-shaped clamping face forms a longitudinally extending ridge and said latch means further comprises; a latch actuator member connected to said detent means for movement therewith and extending parallel to the longitudinally extending ridge associated therewith, each latch actuator member being movable, from a first position disposed laterally outwardly from its associated ridge, when said detent means is in said extended position, to a second position located inwardly from its associated ridge, when the associated detent means is in said retracted position, such that displacement of each latch actuator member from the first position to the second position, when each latch actuator member is engaged by an end effector moving into engagement with the clamping faces, will cause both the detent means to move from their extended positions to their retracted positions.

6. An interface as claimed in claim 5, wherein the reduced waist sections together form a square cross-section to provide first and second sets of oppositely disposed ridges, each latch actuator member being associated with one of the ridges of the first set thereof, the ridges of the second set thereof being spaced from the latch actuator member so as to be engageable by an end effector.

7. A clamping jaw interface for attachment to a unit such as an orbital replacement unit to enable clamping jaws to couple to such unit comprising:

(a) two substantially rigid body portions positioned about a central axis, each body portion having a lower face, an upper ramp, a lower ramp, and a reduced waist section located between the upper and lower ramps, (b) said waist section on each body portion having side faces which converge proceeding outwardly from the central axis to form laterally extending, substantially V-shaped clamping faces on opposite sides of the central axis of the interface;

(c) the upper and lower ramps of each body portion being inclined inwardly towards the side faces of the waist;

(d) each body portion having torque transmitting means located below the waist section for engaging said portions with said unit, whereby:

i) the inwardly inclined ramps will effect vertical engagement of said clamping jaws with said unit against dislodgement by vertical loads applied therebetween, and ii) the substantially V-shaped clamping faces will effect lateral engagement of said clamping jaws with said unit against dislodgement by a torque applied therebetween.

8. A clamping jaw interface as in claim 7 wherein said body portions are integral with each other about the central axis and further comprising a central passage that extends along the central axis of the interface through to the lower face to permit a fastening means to pass therethrough.

9. An interface as in claim 8 wherein said torque transmitting means of each body portion includes a passageway displaced from said central axis and a shaft means which extends through said passageway for engagement with corresponding recesses in said unit.

10. An interface as in claim 7 wherein said torque transmitting means of each body portion includes a passageway displaced from said central axis and a shaft means which extends through said passageway for engagement with corresponding recesses in said unit.

11. A clamping jaw interface for attachment to a unit such as an orbital replacement unit to enable clamping jaws to couple to such unit comprising:

(a) two substantially rigid body portions positioned about a central axis, each body portion having a lower face, an upper ramp, a lower ramp, and a reduced waist section located between the upper and lower ramps, (b) said waist section on each body portion having side faces which converge proceeding outwardly from the central axis to form laterally extending, substantially V-shaped clamping faces on opposite sides of the central axis of the interface;

(c) the upper and lower ramps of each body portion being inclined inwardly towards the side faces of the waist; wherein said body portions are integral with each other about the central axis and further comprising a central passage that extends along the central axis of the interface through to the lower face to permit a fastening means to pass therethrough whereby:

i) the inwardly inclined ramps will effect vertical engagement of said clamping jaws with said unit against dislodgement by vertical loads applied therebetween, and ii) the substantially V-shaped clamping faces will effect lateral engagement of said clamping jaws with said unit against dislodgement by a torque applied therebetween.

* * * * *